United States Patent
Mimori

(10) Patent No.: US 7,715,299 B2
(45) Date of Patent: May 11, 2010

(54) OBJECTIVE OPTICAL SYSTEM, OPTICAL PICKUP APPARATUS AND OPTICAL INFORMATION RECORDING/REPRODUCING APPARATUS WITH DIFFRACTION STRUCTURE AND OPTICAL PATH DIFFERENCE-GENERATING STRUCTURE

(75) Inventor: Mitsuru Mimori, Kokubunji (JP)

(73) Assignee: Konica Minolta Opto, Inc., Tokyo (JP)

(*) Notice: Subject to any disclaimer, the term of this patent is extended or adjusted under 35 U.S.C. 154(b) by 1392 days.

(21) Appl. No.: 11/063,994

(22) Filed: Feb. 24, 2005

(65) Prior Publication Data
US 2005/0190679 A1 Sep. 1, 2005

(30) Foreign Application Priority Data
Feb. 27, 2004 (JP) .............................. 2004-053925

(51) Int. Cl.
*G11B 7/135* (2006.01)
(52) U.S. Cl. .............................. 369/112.05; 369/112.23
(58) Field of Classification Search ................. 359/558, 359/563, 637, 742; 369/112, 109, 112.05–112.08
See application file for complete search history.

(56) References Cited

U.S. PATENT DOCUMENTS

| | | | | | |
|---|---|---|---|---|---|
| 5,073,007 | A | * | 12/1991 | Kedmi et al. | 359/565 |
| 5,257,131 | A | * | 10/1993 | Yoshida et al. | 359/485 |
| 6,188,665 | B1 | * | 2/2001 | Furusawa | 720/663 |
| 6,363,046 | B1 | * | 3/2002 | Yoo et al. | 369/112.23 |
| 6,807,019 | B2 | * | 10/2004 | Takeuchi et al. | 359/742 |
| 6,859,319 | B2 | * | 2/2005 | Hayashi | 359/571 |
| 7,248,409 | B2 | * | 7/2007 | Komma et al. | 359/569 |
| 7,466,642 | B2 | * | 12/2008 | Sano et al. | 369/112.08 |
| 2002/0172132 | A1 | * | 11/2002 | Takeuchi et al. | 369/112.08 |
| 2002/0191526 | A1 | * | 12/2002 | Saito | 369/112.26 |
| 2003/0053223 | A1 | | 3/2003 | Takeuchi et al. | |
| 2003/0107979 | A1 | * | 6/2003 | Kim et al. | 369/112.07 |
| 2003/0185134 | A1 | * | 10/2003 | Kimura et al. | 369/112.08 |
| 2003/0227859 | A1 | * | 12/2003 | Hirai | 369/112.12 |
| 2003/0235137 | A1 | * | 12/2003 | Nishioka et al. | 369/112.05 |
| 2004/0004747 | A1 | * | 1/2004 | Kawabata et al. | 359/205 |
| 2004/0022164 | A1 | | 2/2004 | Nishioka et al. | |
| 2004/0047269 | A1 | | 3/2004 | Ikenaka et al. | |
| 2004/0170106 | A1 | * | 9/2004 | Komma | 369/112.1 |
| 2005/0063283 | A1 | * | 3/2005 | Ori et al. | 369/112.08 |
| 2005/0226122 | A1 | | 10/2005 | Ooi et al. | |

FOREIGN PATENT DOCUMENTS

| | | | |
|---|---|---|---|
| EP | 1022731 | A2 | 7/2000 |
| EP | 1313095 | A2 | 2/2003 |
| EP | 1411506 | A2 | 4/2004 |
| EP | 1500956 | A1 | 1/2005 |
| WO | WO 03/091764 | A1 | 11/2003 |
| WO | WO 2004/012188 | A1 | 2/2004 |

* cited by examiner

*Primary Examiner*—Hoa T Nguyen
*Assistant Examiner*—Mark Fischer
(74) *Attorney, Agent, or Firm*—Finnegan, Henderson, Farabow, Garrett & Dunner, L.L.P.

(57) ABSTRACT

The objective optical system of the present invention includes a first diffraction structure that applies diffraction to the light fluxes of wavelength $\lambda 1$, wavelength $\lambda 2$ and wavelength $\lambda 3$ so that the diffracted lights of the L-th order (L: odd number), M-th order (M: integer) and N-th order (N: integer) each will have the maximum diffraction efficiency, and a first optical path difference-generating structure that substantially provides a phase difference to or two of the light fluxes of wavelength $\lambda 1$, wavelength $\lambda 2$ and wavelength $\lambda 3$.

2 Claims, 7 Drawing Sheets

OPTICAL AXIS L

OPTICAL AXIS L

OPTICAL AXIS L

OPTICAL AXIS L

OPTICAL AXIS L

OPTICAL AXIS L

OBJECTIVE OPTICAL SYSTEM, OPTICAL PICKUP APPARATUS AND OPTICAL INFORMATION RECORDING/REPRODUCING APPARATUS WITH DIFFRACTION STRUCTURE AND OPTICAL PATH DIFFERENCE-GENERATING STRUCTURE

RELATED APPLICATION

This application is based on patent application No. 2004-53925 filed in Japan, the entire content of which is hereby incorporated by reference.

BACKGROUND OF THE INVENTION

1. Field of the Invention

The present invention relates to an objective optical system, optical pickup apparatus and optical information recording/reproducing apparatus.

2. Description of the Related Art

In recent years, in an optical pickup apparatus, there has been a growing tendency for adopting a short wavelength laser light source as a laser light source for reproducing the information recorded on an optical disk and for recording the information on an optical disk. For example, there have been efforts made for commercial use of a laser light source having a wavelength of 405 nm such as in a blue-violet semiconductor laser and blue-violet SHG laser for converting the wavelength of an infrared semiconductor laser using the second harmonic wave.

When employing an objective lens having the same numerical aperture (NA) as that of the DVD (Digital Versatile Disk), use of such a blue-violet laser light source allows recording the information of 15-20 GB on an optical disk having a diameter of 12 cm. When the numerical aperture (NA) of the objective lens is increased to 0.85, it permits recording the information of 23-25 GB on the optical disk having a diameter of 12 cm. In the following description of this specification, the optical disk and magnetic optical disk using a blue-violet laser light source will be collectively called the high-density optical disk.

Although, the appropriate recording/reproducing (recording and/or reproducing) of the information is said to be performed using such a high-density optical disk, the value of an optical disk player/recorder as a product cannot be said to be sufficient. In the following description, "recording/reproducing" refers to recording and/or reproducing.

Based on the fact that the DVDs (Digital Versatile Disc) and CDs (Compact Disk) recording a great variety of information are being marketed at present, the mere recording/reproducing of information using a high-density optical disk is not sufficient. For example, the capability of similarly appropriate recording/reproducing of information using the DVDs and CDs owned by a user amounts to raising of the product value of an optical disk player/recorder for a high-density optical disk. Against this backdrop, an optical pickup apparatus mounted on the optical disk player/recorder for a high-density optical disk is preferred to have performances of ensuring the appropriate recording/reproducing of information, while maintaining the compatibility among three types of optical disks—high-density optical disk, DVD and CD.

One of the methods for ensuring appropriate recording/reproducing of information while maintaining the compatibility among the high-density optical disk, DVD and CD is to provide the optical system for high-density optical disk and the optical system for DVD and CD separately so that switching will be made between these two systems in response to the recording density of the optical disk for recording/reproducing of information. This method, however, requires a plurality of optical systems. This is disadvantageous for reduction of physical size and production costs.

Thus, to simplify the configuration of the optical pickup apparatus and to reduce the cost, it is preferred in an optical pickup apparatus having compatibility to provide commonality between the optical system for high-density optical disk and optical system for DVD and CD, and to minimize the number of optical parts constituting the optical pickup apparatus. Simplification of the configuration of the optical pickup apparatus and cost cutting are enhanced by providing commonality of the objective optical system arranged opposite to the optical disk. To get the objective optical system that can be used in common for a plurality of the optical disks, having different wavelengths of light flux, to be used for recording/reproducing, it is necessary to form in an objective optical system a phase structure where spherical aberration depends on wavelength.

In this case, however, the wavelengths of the light flux used in each optical disk and the thicknesses of the protective substrate are different. This makes it difficult to form a satisfactorily aberration-corrected light condensed spot on the surface of the optical disk where information is recorded. Thus, the known art of correcting the aberration is to provide a diffraction structure on the optical surface of the objective lens that is a constituent element of the optical pickup apparatus. (For example, see Patent Document 1: Official Gazette of Japanese Patent Tokkai 2002-298422).

However, the art disclosed in Patent Document 1 for aberration correction is configured in such a structure that a diffraction structure is provided on one surface of the objective lens. It provides a sufficient spherical aberration correcting function for recording/reproducing using two types of the optical disks using different wavelengths and/or having different protective substrate thicknesses. However, the following problem must be solved before a sufficient compatibility is achieved among three types of optical disks.

The wavelengths of the light fluxes used in the high-density optical disk, DVD and CD are $\lambda 1$=about 400 nm, $\lambda 2$=about 655 nm and $\lambda 3$=about 785 nm, respectively. Since $\lambda 1:\lambda 3 \approx 1:2$, the ratio of the of the diffraction order providing the maximum diffraction efficiency is $\lambda 1:\lambda 3 = 2:1$ in the blazed diffraction structure. (For example, when the order of diffraction providing the maximum diffraction efficiency in relation to the light flux of $\lambda 1$ is 6, the order of diffraction providing the maximum diffraction efficiency in relation to the light flux of $\lambda 3$ is 3).

Further, the effect of diffraction is determined by the difference between the value of wavelength of a diffracted light times the diffraction order of the diffracted light and the value of wavelength of an other diffracted light times the diffraction order of the other diffracted light, and by the pitch of the diffraction. Therefore, the value, $(\lambda 1 \times 2)-(\lambda 3 \times 1)$, is reduced when the ratio of the diffraction order of $\lambda 1$ and $\lambda 3$ is 2 to 1. Thus, when the diffraction structure is designed with the blazed wavelength as the value close to even number times the wavelength $\lambda 1$, for example, then there will be a reduced mutual diffraction in the light flux of the wavelength $\lambda 1$ and that of $\lambda 3$. This will result in difficult compatibility between the high-density optical disk and CD.

To be more specific, even if the difference between the value of wavelength of a diffracted light times the diffraction order of the diffracted light and the value of wavelength of an other diffracted light times the diffraction order of the other diffracted light is small, it is theoretically possible to achieve compatibility by using a small diffraction. In this case, however, the pitch of the ring-shaped zones of the diffraction structure must be reduced. If the pitch of the ring-shaped zones of the diffraction structure is reduced, it will become difficult to fabricate an optical element such as a lens and there will be a reduction in the amount of the transmitted light of the fabricated optical element. Further, a large aberration will be caused by the variation of the wavelength within the minute range of several nanometers due to the variation in the laser light source output and others. Such problems will be left unsolved.

SUMMARY OF THE INVENTION

In view of the prior art described above, it is an object of the present invention to solve the above-mentioned problems.

Another object of the present invention is to provide an objective optical system, an optical pickup apparatus and an optical information recording/reproducing apparatus, capable of ensuring the compatibility among three types of optical disks—high-density optical disk using a blue-violet laser light source, DVD and CD—, and securing the amount of light as well as correcting spherical aberration.

A further object of the present invention is to provide an objective optical system, optical pickup apparatus and optical information recording/reproducing apparatus, capable of reducing the generation of coma aberration also by shifting the objective lens by tracking, when recording or reproducing information using an optical disk, and providing excellent off-axis characteristics.

These and other objects of the present invention are attained by:

an objective optical system for use in an optical pickup apparatus for recording and/or reproducing information from or onto a first optical disk having a protective layer thickness t1 using a first light flux having a wavelength λ1 emitted from a first light source, for recording and/or reproducing information from or onto a second optical disk having a protective layer thickness t2 (t1≦t2) using a second light flux having a wavelength λ2 (λ1<λ2) emitted from a second light source, and for recording and/or reproducing information from or onto a third optical disk having a protective layer thickness t3 (t2<t3) using a third light flux having a wavelength λ3 (λ2<λ3) emitted from a third light source, the objective optical system comprising:

a first diffraction structure for providing diffraction to the first light flux, the second light flux and third light flux, so that a diffraction efficiency of a L-th order (L: odd number) diffracted light of the first light flux is greater than that of any other order diffracted light of the first light flux, so that a diffraction efficiency of a M-th order (M: integer) diffracted light of the second light flux is greater than that of any other order diffracted light of the second light flux, and so that a diffraction efficiency of a N-th order (N: integer) diffracted light is greater than that of any other order diffracted light of the third light flux; and a first optical path difference-generating structure for not substantially providing any phase difference to at least one of the first light flux, the second light flux and the third light flux, but for substantially providing a phase difference to one or two of the first light flux, the second light flux and the third light flux.

Further, these and other objects of the present invention are also attained by:

an objective optical system for use in an optical pickup apparatus for recoding and/or reproducing information from or onto a first optical disk having a protective layer thickness t1 using a first light flux having a wavelength λ1 emitted from a first light source, for recoding and/or reproducing information from or onto a second optical disk having a protective layer, thickness t2 (t1≦t2) using a second light flux having a wavelength λ2 (λ1<λ2) emitted from a second light source, and for recoding and/or reproducing information from or onto a third optical disk having a protective layer thickness t3 (t2<t3) using a third light flux having a wavelength λ3 (λ2<λ3) emitted from a third light source, the objective optical system comprising:

a first diffraction structure for providing diffraction to the first light flux, the second light flux and the third light flux, so that a diffraction efficiency of a L-th order (L: odd number) diffracted light of the first light flux is greater than that of any other order diffracted light of the first light flux, so that a diffraction efficiency of a M-th order (M: integer) diffracted light of the second light flux is greater than that of any other order diffracted light of the second light flux, and so that a diffraction efficiency of a N-th order (N: integer) diffracted light is greater than that of any other order diffracted light of the third light flux; and a first optical path difference-generating structure for substantially providing a phase difference to one or two of the first light flux, the second light flux and the third light flux;

wherein in case that the first light flux is applied, the first light flux passes through the first diffraction structure and the first optical path difference-generating structure and forms a satisfactory light condensed spot on an information recording surface of the first optical disk;

wherein in case that the second light flux is applied, the second light flux passes through the first diffraction structure and the first optical path difference-generating structure and forms a satisfactory light condensed spot on an information recording surface of the second optical disk; and wherein in case that the third light flux is applied, the third light flux passes through the first diffraction structure and the first optical path difference-generating structure and forms a satisfactory light condensed spot on an information recording surface of the third optical disk.

These and other objects of the present invention are further attained by:

an optical pickup apparatus comprising:

a first light source for emitting a first light flux having a wavelength λ1;

a second light source for emitting a second light flux of wavelength λ2;

a third light source for emitting a third light flux having a wavelength λ3; and the above-mentioned objective optical system.

These and other objects of the present invention are still further attained by:

an optical information recording/reproducing apparatus comprising an optical disk loading section for loading an optical disk, and the above-mentioned optical pickup apparatus.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENT

Figure 1:
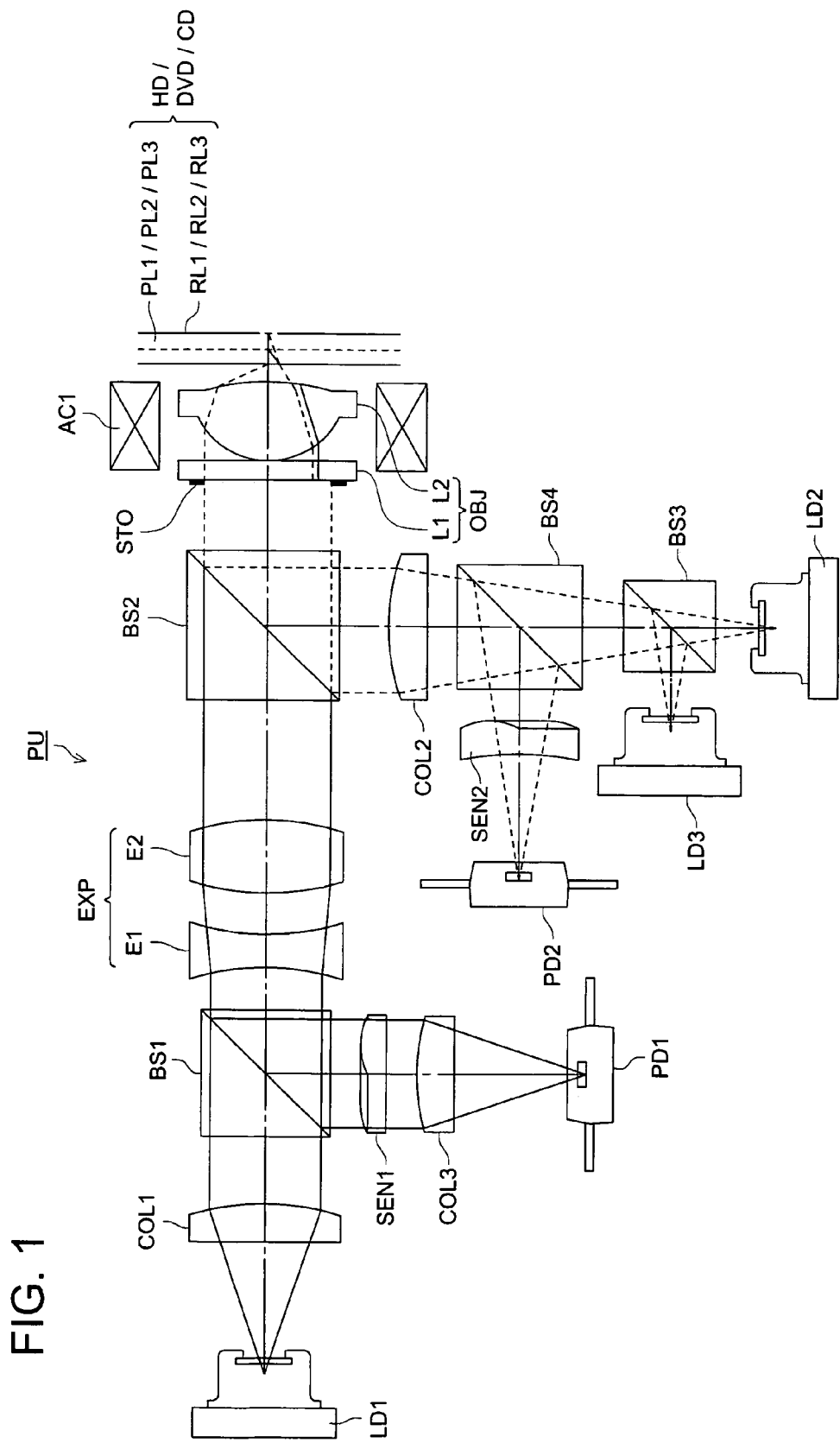
FIG. 1 is a major portion plan view representing the configuration of an optical pickup apparatus.

According to the first embodiment of the present invention, in an objective optical system used in an optical pickup apparatus wherein information is reproduced and/or recorded using a first optical disk having a protective layer thickness t1 using the light flux having a wavelength $\lambda 1$ emitted from a first light source; information is reproduced and/or recorded using a second optical disk having a protective layer thickness t2 (t1$\leq$t2) using the light flux having a wavelength $\lambda 2$ ($\lambda 1<\lambda 2$) emitted from a second light source; and information is reproduced and/or recorded using a third optical disk having a protective layer thickness t3 (t2<t3) using the light flux having a wavelength $\lambda 3$ ($\lambda 2<\lambda 3$) emitted from a third light source;

the above-mentioned objective optical system is preferred to comprise:

a first diffraction structure that applies diffraction to the light fluxes of wavelength $\lambda 1$, wavelength $\lambda 2$ and wavelength $\lambda 3$ so that the diffracted light of the L-th order (L: odd number), M-th order (M: integer) and N-th order (N: integer) each will have the maximum diffraction efficiency; and a first optical path difference-generating structure that does not substantially provide any phase difference to at least one of the light fluxes of the wavelength $\lambda 1$, wavelength $\lambda 2$ and wavelength $\lambda 3$, but does substantially provide a phase difference to one or two of these light fluxes.

According to the second embodiment of the present invention, in an objective optical system used in an optical pickup apparatus wherein information is reproduced and/or recorded using a first optical disk having a protective layer thickness t1 using the light flux having a wavelength $\lambda 1$ emitted from a first light source; information is reproduced and/or recorded using a second optical disk having a protective layer thickness t2 (t1$\leq$t2) using the light flux having a wavelength $\lambda 2$ ($\lambda 1<\lambda 2$) emitted from a second light source; and information is reproduced and/or recorded using a third optical disk having a protective layer thickness t3 (t2<t3) using the light flux having a wavelength $\lambda 3$ ($\lambda 2<\lambda 3$) emitted from a third light source;

the above-mentioned objective optical system is preferred to comprise:

a first diffraction structure that applies diffraction to the light fluxes of wavelength $\lambda 1$, wavelength $\lambda 2$ and wavelength $\lambda 3$ so that the diffracted light of the L-th order (L: odd number), M-th order (M: integer) and N-th order (N: integer) each will have the maximum diffraction efficiency; and a first optical path difference-generating structure for substantially providing a phase difference to one or two of the wavelength $\lambda 1$, wavelength $\lambda 2$ and wavelength $\lambda 3$; wherein it is preferred that:

when the light flux of the wavelength $\lambda 1$ is applied, it passes through the first diffraction structure and first optical path difference-generating structure, and forms a satisfactory light condensed spot on the information recording surface of the first optical disk;

when the light flux of the wavelength $\lambda 2$ is applied, it passes through the first diffraction structure and first optical path difference-generating structure, and forms a satisfactory light condensed spot on the information recording surface of the second optical disk; and when the light flux of the wavelength $\lambda 3$ is applied, it passes through the first diffraction structure and first optical path difference-generating structure, and forms a satisfactory light condensed spot on the information recording surface of the third optical disk.

According to the above-mentioned first and second embodiments, it is possible to apply effective diffraction to that of the wavelength $\lambda 3$ as well as the light flux of the wavelength $\lambda 1$, by using the first diffraction structure and the odd-numbered order of diffraction of the diffracted light where the diffraction efficiency is the maximum, out of the diffracted light of the wavelength $\lambda 1$, whereby compatibility based on diffraction is enhanced.

Further, the first optical path difference-generating structure, allows the phase difference to be applied substantially to one or two of the light fluxes having the wavelength $\lambda 1$, wavelength $\lambda 2$ and wavelength $\lambda 3$. This allows aberration correction to be applied to one or two light fluxes where insufficient correction or excessive correction is caused by the diffraction by the first diffraction structure, whenever required.

According to the third embodiment of the present invention, in the objective optical system described in the first and second embodiments, magnification of image formation by the above-mentioned objective optical system is preferred to be substantially the same when information is reproduced or recorded on the first, second and third optical disks.

This arrangement allows the spherical aberration to be corrected satisfactorily for the light fluxes of the wavelength $\lambda 1$, wavelength $\lambda 2$ and wavelength $\lambda 3$. Further, this arrangement allows use of a plurality of light sources integrated in one package, thereby reducing the number of parts used in the optical pickup apparatus and contributing to miniaturization of the optical pickup apparatus and reduction in production costs.

According to the fourth embodiment of the present invention, in the objective optical system described in the third embodiment, the magnification of image formation is preferred to be 0 (zero).

According to the fifth embodiment of the present invention, in the objective optical system described in any one of the first through third embodiments, it is preferred that, when information is reproduced and/or recorded using the first optical disk, the light flux of the wavelength $\lambda 1$ be applied to the objective optical system as the parallel light flux; when information is reproduced and/or recorded using the second optical disk, the light flux of the wavelength $\lambda 2$ be applied to the objective optical system as the parallel light flux; and when information is reproduced and/or recorded using the third optical disk, the light flux of the wavelength $\lambda 3$ be applied to the objective optical system as the parallel light flux.

According to the fourth and fifth embodiments, all the light fluxes of wavelength $\lambda 1$, wavelength $\lambda 2$ and wavelength $\lambda 3$ are applied to the objective optical system as parallel light fluxes. Thus, even when the objective optical system has shifted in the direction of a track, occurrence of coma aberration and astigmatism can be reduced. To put it another way, this arrangement improves the off-axis characteristics in the shift of the objective optical system (lens shift) at the time of tracking.

According to the sixth embodiment of the present invention, the first optical path difference-generating structure is preferred to substantially provide a phase difference only to one or two of the light fluxes of wavelength λ1, wavelength λ2 and wavelength λ3.

According to the seventh embodiment of the present invention, in the objective optical system described in the second embodiment, the first optical path difference-generating structure is preferred to substantially provide a phase difference only to the light flux of the wavelength λ2, out of the light fluxes of wavelength λ1, wavelength λ2 and wavelength λ3. When the light flux of the wavelength λ2 is applied, a satisfactory light condensed spot is preferably formed on the information recording surface of the second optical disk by the first diffraction structure and the first optical path difference-generating structure.

According to the eighth embodiment of the present invention, in the objective optical system described in any one of the first through seventh embodiments, the first diffraction structure is preferably arranged in a serrated form and the first optical path difference-generating structure is preferably composed of a plurality of the ring-shaped zones, having a stepped structure, arranged concentrically about the optical axis.

According to the ninth embodiment of the present invention, in the objective optical system described in the eighth embodiment, the objective optical system is composed of one optical element or a combination of two or more optical elements. It is preferred that $1.8 \times d \leq d1 \leq 2.2 \times d$, and $4 \leq m1 \leq 6$ be satisfied when $d=\lambda1/(n1-1)$ is assumed on condition that:

n1 represents the refraction index, with respect to the light flux having a wavelength λ1, of the optical element with the optical path difference-generating structure formed thereon;

d1 represents the amount of level differences in the optical axis direction of the stepped structure in the first optical path difference-generating structure; and m1 (an integer) represents the number of discontinuous portions in the stepped structure.

According to the above arrangement, the first diffraction structure allows correction of the spherical aberration and/or the wavefront aberration of the light flux having wavelengths λ1 and λ3. The first optical path difference-generating structure permits correction of the spherical aberration and/or the wavefront aberration of the light flux having wavelength λ2. This arrangement allows the aberration correction function of each wavelength to be shared by a plurality of structures, without one particular diffraction structure taking charge thereof, with the result that the degree of freedom in lens designing is enhanced.

According to the tenth embodiment of the present invention, in an objective optical system described in any one of the first through ninth embodiments, the first optical path difference-generating structure preferably applies the phase difference only to the light flux having wavelength λ2, out of the light fluxes having wavelength λ1, wavelength λ2 and the wavelength λ3.

According to this arrangement, the first diffraction structure allows correction of the spherical aberration and/or the wavefront aberration of the light flux having wavelengths λ1 and λ3. The first optical path difference-generating structure permits correction of the spherical abberation and/or the wavefront aberration of the light flux having wavelength λ2. This arrangement allows the aberration correction function of each wavelength to be shared by a plurality of structures, without one particular diffraction structure taking charge thereof, with the result that the degree of freedom in lens designing is enhanced.

According to the eleventh embodiment of the present invention, in the objective optical system described in any one of the first through tenth embodiments, it is preferred that the wavelength λ1, wavelength λ2 and wavelength λ3 satisfy the following conditions:

370 nm $\leq \lambda1 \leq$ 450 nm
620 nm $\leq \lambda2 \leq$ 690 nm
750 nm $\leq \lambda3 \leq$ 830 nm According to the twelfth embodiment of the present invention, in the objective optical system described in any one of the first through eleventh embodiments, it is preferred that L=M=1.

According to the thirteenth embodiment of the present invention, in the objective optical system described in any one of the first through eleventh embodiments, it is preferred that L=M=N=1.

According to the fourteenth embodiment of the present invention, in the objective optical system described in any one of the first through eleventh embodiments, it is preferred that L=3 and M=N=2.

According to the twelfth through fourteenth embodiments, changes in the diffraction efficiency can be minimized even if there is a variation in the wavelength of the light flux emitted from the light source (e.g. when the wavelength λ1 of the light flux emitted from the light source varies about several nanometers due to the light source manufacturing error and others), or there is a wavelength variation. As the order of diffraction is lower, changes in the diffraction efficiency due to the variation in wavelength can be made smaller. Thus, the above-mentioned thirteenth embodiment is more preferable.

According to the fifteenth embodiment of the present invention, in an objective optical system described in any one of the first through fourteenth embodiments, it is preferred that $\eta1>70\%$, $\eta2>70\%$ and $\eta3<80\%$ be satisfied where the diffraction efficiencies of the diffracted light of the L-th order, M-th order and N-th order are assumed as $\eta1$, $\eta2$ and $\eta3$.

This arrangement improves the signal-to-noise ratio, while minimizing the unwanted light fluxes, i.e. noise components that are not used for recording/reproducing of the information from the optical disk.

Further, it is further preferred that $\eta1>85\%$, $\eta>80\%$ and $\eta3<75\%$ be satisfied. This will better ensure the amounts of the diffracted light of L-th order and the diffracted light of M-th order, and will further improve the signal-to-noise ratio. The upper limits of the $\eta1$ and $\eta2$ and the lower limit of the $\eta3$ are preferably $100\% \geq \eta1$, $100\% \geq \eta2$ and $40\% < \eta3$.

According to the sixteenth embodiment of the present invention, in an objective optical system described in any one of the first through fifteenth embodiments, it is preferred that the objective optical system be composed of a combination of at least two optical elements—a first optical element arranged on the light source side and a second optical element arranged on the optical disk side.

This arrangement increases the degree of freedom in the correction of aberration by the two-group configuration of the objective optical system consisting of two optical elements.

According to the seventeenth embodiment of the present invention, in an objective optical system described in any one of the first through fifteenth embodiments, it is preferred that the objective optical system be composed of a combination of at least two optical elements—a first optical element arranged on the light source side and a second optical element arranged on the optical disk side.

According to the eighteenth embodiment of the present invention, in an objective optical system described in the sixteenth or seventeenth embodiment, it is preferred that the first optical element be provided with the first optical path difference-generating structure and the second optical element be provided with the first diffraction structure.

This arrangement allows one optical element to be provided with one structure, and hence increases the tolerance in molding of the optical element as a single unit as compared to the case where one optical element is provided with two structures.

According to the nineteenth embodiment of the present invention, in an objective optical system described in the eighteenth embodiment, it is preferred that the optical surface of the first optical element on the side of the light source be provided with the first optical path difference-generating structure.

Especially when the first optical path difference-generating structure is designed in a step-formed diffraction structure, the amount of level differences in the direction of optical axis is greater than that in the serrated diffraction structure. This is likely to cause eclipse due to oblique incidence, and reduces diffraction efficiency. This arrangement minimizes such eclipse and reduction of diffraction efficiency.

According to the twentieth embodiment of the present invention, in an objective optical system described in the sixteenth or seventeenth embodiment, it is preferred that the first optical element be equipped with the first optical path difference-generating structure and first diffraction structure.

According to the twenty first embodiment of the present invention, in an objective optical system described in the twentieth embodiment, it is preferred that the optical surface of the first optical element on the light source side be provided with the first optical path difference-generating structure.

According to the twenty second embodiment of the present invention, in any objective optical system described in the sixteenth through twenty first embodiments, it is preferred that, when the focal distance of the first optical element is fa and the focal distance of the second optical element is fb, the condition of |1/fa|<0.02 mm$^{-1}$ be satisfied.

Since this arrangement reduces the refracting power of the first optical element, the assembling error of the first and second optical elements can be minimized.

According to the twenty third embodiment of the present invention, in any objective optical system described in the sixteenth through twenty second embodiments, it is preferred that the paraxial curvature radius be approximately infinite on at least one of the surfaces of the first optical element.

Since this arrangement reduces the refracting power of the first optical element, the assembling error of the first and second optical elements can be minimized.

According to the twenty fourth embodiment of the present invention, in any objective optical system described in first through twenty third embodiments, it is preferred that the above-mentioned objective optical system be provided with a second optical path difference-generating structure that does not substantially provide the phase differences to the light fluxes of the wavelength λ1 and wavelength λ2, but does substantially provide the phase difference to the light flux of the wavelength λ3;

wherein the second optical path difference-generating structure is composed by formation of a plurality of ring-shaped zones arranged concentrically about the optical axis;

second optical path difference-generating structure is set in such a way as to provide the optical path difference P times that of the wavelength λ1, when the light flux of the wavelength λ1 passes through each ring-shaped zone of the second optical path difference-generating structure; and to provide the optical path difference Q times that of the wavelength λ2, when the light flux of the wavelength λ1 passes through each ring-shaped zone of the second optical path difference-generating structure; and the combination of the P and Q be any one of (P, Q)=(5, 3), (8, 5) and (10, 6).

This configuration allows the second optical path difference-generating structure of the objective optical system to provide the each optical path difference P times that of the wavelength λ1 and Q times that of the wavelength λ2 when the light fluxes of the wavelength λ1 and wavelength λ2 pass through each ring-shaped zone of the second optical path difference-generating structure, whereby each phase difference is not substantially provided to the light fluxes of the wavelength λ1 and wavelength λ2. This arrangement ensures that the spherical aberration caused by the passage of the second optical path difference-generating structure offsets the spherical aberration caused by this light flux passing through the first diffraction structure and first optical path difference-generating structure, when the wavelength used varies within minute range (of the order of several nanometers). This reduces the amount of spherical aberration generated in the entire pickup apparatus when the wavelength used varies within minute range.

According to the twenty fifth embodiment of the present invention, in an objective optical system described in twenty-fourth embodiment, it is preferred that φ(hmax)>0 be satisfied, when the second optical path difference-generating structure is represented as φ(h)=(B$_2$×h$^2$+B$_4$×h$^4$+ . . . +B$_{2i}$×h$^{2i}$)×λ×P, using the optical path difference function φ(h), and the coefficient B$_2$=0 is substituted therein; wherein "h" is the height from the optical axis, "B$_{2i}$" is the coefficient of the optical path difference function, "i" is a natural number, "λ" is the blazed wavelength, and "hmax" is the height from the optical axis corresponding to the numerical aperture of the first optical disk on the optical disk side. When the optical element equipped with the second optical path difference-generating structure is composed particularly of a plastic, this configuration is capable of minimizing the occurrence of aberration resulting from variations in refraction index when there is a change in the ambient temperature.

According to the twenty sixth embodiment of the present invention, in an objective optical system described in the twenty fifth embodiment, it is preferred that coefficient A$_2$≠0, when the first diffraction structure is represented as φ$_1$(h)=(A$_2$×h$^2$+A$_4$×h$^4$+ . . . +A$_{2i}$×h$^{2i}$)×λ×N, using the first diffraction structure; wherein "h" is the height from the optical axis, "A$_{2i}$" is the coefficient of the optical path difference function, "i" is a natural number, and "λ" is the blazed wavelength. By using the coefficient A$_2$≠0, this arrangement allows the focal position of unwanted light flux to be removed from the focal position of the light flux used, thereby enhancing the detecting performance of the reflected light in the detector of the pickup apparatus. It should be noted that maintenance of the range of |A$_2$|>0.02 is further preferable in enhancing the above-mentioned detecting performance.

According to the twenty seventh embodiment of the present invention, in an objective optical system described in the twenty fourth embodiment, it is preferred that coefficient B$_2$≠0, when the second optical path difference-generating structure is represented as φ(h)=(B$_2$×h$^2$+B$_4$×h$^4$+ . . . +B$_{2i}$×h$^{2i}$)×λ×P, using the optical path difference function φ(h); wherein "h" is the height from the optical axis, "B$_{2i}$" is the coefficient of the optical path difference function, "i" is a natural number, and "λ" is the blazed wavelength.

By using the coefficient B$_2$≠0, this arrangement allows the focal position of unwanted light flux to be removed from the focal position of the light flux used, thereby enhancing the detecting performance of the reflected light in the detector of the pickup apparatus. It should be noted that maintenance of the range of $|B_2|>0.02$ is further preferable in enhancing the detecting performance.

According to the twenty eighth embodiment of the present invention, in an objective optical system described in any one of the first through twenty-seventh embodiment, it is preferred that the focal position of the N-th order diffracted light and that of the (N±1)-th order diffracted light be kept apart from each other 0.01 mm or more in the direction of optical axis, when information is reproduced and/or recorded using the third optical disk.

By keeping the focal position of the N-th order diffracted light and that of the (N±1)-th order diffracted light apart from each, this arrangement improves the detecting performance of the reflected light of N-order diffracted light in the optical detector of the optical pickup apparatus.

According to the twenty ninth embodiment of the present invention, in an objective optical system described in any one of the first through twenty eighth embodiments, it is preferred that an aperture restricting function be provided.

This configuration reduces the number of parts constituting the objective optical system, and permits miniaturization and cost reduction.

According to the thirtieth embodiment of the present invention, in an objective optical system described in twenty ninth embodiment, it is preferred that the aperture restricting function be fulfilled by the dichroic filter that allows only the light flux having a specific wavelength to pass through.

According to the thirty first embodiment of the present invention, in an objective optical system described in twenty ninth embodiment, it is preferred that the aperture restricting function be fulfilled by the function of condensing this light flux outside the information recording surface by assigning a diffraction to the light flux having a predetermined wavelength.

This arrangement eliminates the need of installing a separate dichroic provided with special coating characterized by wavelength selecting capability, and also contributes to the reduction of physical size and production costs.

According to the thirty second embodiment of the present invention, in an objective optical system described in any one of the first through thirty first embodiments, it is preferred that at least one of the surfaces of the first optical element be concentrically arranged about the center of the optical axis, and divided into at least two areas—a first area including the optical axis and a second area located around the first area; it is further preferred that the light flux of the wavelength λ3 having passed the second area be condensed outside the information recording surface of the third optical disk, when diffraction is applied to the light flux of the wavelength λ3 having passed the second area.

According to the thirty third embodiment of the present invention, in an objective optical system described in the thirty second embodiment, it is preferred that a third area be provided around the second area, and the light flux of the wavelength λ1 having passed the third area be condensed outside the information recording surface of the first optical disk, or the light flux of the wavelength λ2 having passed the third area be condensed outside the information recording surface of the second optical disk.

This configuration prevents an adverse effect of noise resulting from unwanted light flux unused for recording/reproducing of information from the optical disk.

According to the thirty four embodiment of the present invention, in an objective optical system described in the thirty second or thirty third embodiment, it is preferred that the first area be provided with the above-mentioned first diffraction structure.

According to the thirty fifth embodiment of the present invention, in an objective optical system described in the thirty second or thirty third embodiment, it is preferred that the first area be provided with the first optical path difference-generating structure, and the second area be divided into an area 2A closer to the optical axis and an area 2B farther from the optical axis, wherein the area 2A be provided with a second diffraction structure composed by formation of a plurality of ring-shaped zones having a stepped structure, arranged concentrically about the center of the optical axis, and the second diffraction structure substantially provides the phase difference to the light fluxes of the wavelengths λ2 and λ3, without providing it to the light flux of the wavelength λ1 substantially.

According to the thirty sixth embodiment of the present invention, in an objective optical system described in any one of the first through thirty five embodiments, it is preferred that t1=t2.

According to the thirty seventh embodiment of the present invention, the optical pickup apparatus preferably comprises:

a first light source emitting the light flux having a wavelength λ1;

a second light source emitting the light flux having a wavelength λ2;

a third light source emitting the light flux having a wavelength λ3; and the objective optical system described in any one of the first through thirty sixth embodiments.

According to the thirty eighth embodiment of the present invention, the optical information recording/reproducing apparatus preferably comprises an optical disk loading mechanism for loading an optical disk and the optical pickup apparatus described in the thirty seventh embodiment.

Further, in each of the above-mentioned embodiments, the wavelength λ1 and wavelength λ3 preferably satisfy the following relation in order to achieve compatibility based on effective diffraction applied at a high diffraction efficiency:

$$1.6 \leq \lambda 3/\lambda 1 \leq 2.3$$

Since the wavelength λ3 is approximately twice the wavelength λ1 using the first diffraction structure, and since an odd-numbered number is employed to represent the order of diffraction of the diffracted light having the maximum diffraction efficiency, out of the diffracted light having the wavelength λ1, using the first diffraction structure, this arrangement provides more effective diffraction to the light flux of the wavelength λ3 as well to that of the wavelength λ1, with the result that compatibility based on diffraction is further enhanced.

In the present specification, the optical disk using a blue-violet semiconductor laser or blue-violet SHG laser as a light source for recording/reproducing of information is collectively called a "high-density optical disk". Information recording/reproducing is carried out by the NA 0.85 objective optical system. Information recording/reproducing is carried out by an NA 0.65 through 0.67 objective optical system, in addition to the optical disk equipped with protective layer (protective film or protective substrate) having a thickness of around 0.1 mm, wherein the optical disk equipped with protective layer having a thickness of around 0.6 mm (e.g. HD and DVD) is also included. Further, in addition to the optical disk equipped with such a protective layer on the information recording surface, the optical disk provided with the protective layer having a thickness of about several nanometers through several tens of nanometer on the information recording surface, and the optical disk having a protective layer without any thickness are also included. In the present specification, the high-density optical disk also includes the magnetic optical disk using a blue-violet semiconductor laser or blue-violet SHG laser as a light source for recording/reproducing of information.

In the present specification, the DVD is a generic term covering the DVD-based optical disk such as a DVD-ROM, DVD-Video, DVD-Audio, DVD-RAM, DVD-R, DVD-RW, DVD+R and DVD-RW. The CD is a generic term covering the CD-based optical disk such as a CD-ROM, CD-Audio, CD-Video, CD-R and CD-RW.

Further, in the present specification, the "objective optical system" of an optical pickup apparatus is defined as an optical system, arranged opposite to the optical disk, containing at least a condensing element having the function of condensing the light fluxes having different wavelengths emitted from the light source, onto the information recording surface of each of the optical disks having different recording densities (capacities). The objective optical system may consist of the condensing element alone.

Further, when there is an optical element capable of tracking and focusing by the actuator integrated with the above-mentioned condensing element, the objective optical system is provided by the optical system consisting of the optical element and the condensing element.

The wording "does not substantially assign any phase difference" in the present specification is not restricted to reference to the state where there is no phase shift at all; this wording also refers to the state where the shift of the phase subsequent to assignment of the optical path difference is within $\pm 0.2\,\pi$. Thus, in the present specification, the wording "does substantially assign a phase difference" refers to the state where the shift of the phase subsequent to assignment of the optical path difference is outside the range of $\pm 0.2\,\pi$.

In the present specification, "to form a satisfactory light condensed spot" is to ensure that the wavefront aberration on the information recording surface of the relevant optical disk does not exceed 0.07 $\lambda$rms.

In the present specification, the wording "magnification of image formation is substantially the same" indicates the case where the difference in the magnification of image formation is within $\pm 0.008$.

In the present specification, the wording "curvature radius is approximately infinite" indicates the case where the curvature radius on the optical radium is equal to or greater than 200 mm. It is more preferred that the curvature radius on the optical radium be equal to or greater than 500 mm, and the surface be flat.

The wording "optical path difference-generating structure" in the present specification refers to the structure where the incidence light flux is assigned with optical path difference. For example, it includes the diffraction structure for causing a diffracted light to be produced on the light flux of specific wavelength, or the structure (phase difference-generating structure) for assigning phase difference to the light flux of specific wavelength.

BEST FORM OF EMBODIMENT OF THE PRESENT INVENTION

Referring to drawings, the following describes the best form of embodying the present invention:

FIG. 1 is a drawing schematically representing the configuration of a first optical pickup apparatus capable of recording and/or reproducing the information adequately using any of a high-density optical disk HD (first optical disk), a DVD (second optical disk) and a CD (third optical disk).

Embodiment 1

In terms of optical specifications, the high-density optical disk HD is characterized by the first wavelength $\lambda 1$ of 408 nm, the first protective layer PL1 having a thickness t1 of 0.0875 mm, and the numerical aperture of NA1 of 0.85; the DVD is characterized by the second wavelength $\lambda 2$ of 658 nm, the second protective layer PL2 having a thickness t2 of 0.6 mm, and the numerical aperture NA2 of 0.60; and the CD is characterized by the third wavelength $\lambda 3$ of 785 nm, the third protective layer PL3 having a thickness t3 of 1.2 mm, and the numerical aperture NA3 of 0.45.

The relationship of the recording densities (capacities) ($\rho 1$, $\rho 2$ and $\rho 3$) among the first, second and third optical disks can be represented as $\rho 3 < \rho 2 < \rho 1$. When information is recorded and/or reproduced using each of the first, second and third optical disks, the magnifications of image formation (first magnification M1, second magnification M2 and third magnification M3) of the objective optical system OBJ are expressed as M1=M2=M3=0. In the present invention, however, the combinations among the wavelength, thickness of the protective layer, numerical aperture, recording density (capacity) and magnification are not restricted to this example alone.

The optical pickup apparatus PU comprises a blue-violet semiconductor laser LD1 (first light source) emitting light flux having a wavelength of 408 nm (the first light flux of the first wavelength $\lambda 1$) when information is recorded and/or reproduced using the high-density optical disk HD, a first light detectors PD1 for receiving the light flux reflected from the information recording surface RL1 of the high-density optical disk HD, a red semiconductor laser LD2 (second light source) emitting light flux having a wavelength of 658 nm (the second light flux of the second wavelength $\lambda 2$) when information is recorded and/or reproduced using the DVD, an infrared semiconductor laser LD3 (third light source) emitting light flux having a wavelength of 785 nm (the third light flux of the second wavelength $\lambda 3$) when information is recorded and/or reproduced using the CD, a second light detectors PD2 for receiving the light flux reflected from the information recording surface RL2 of the DVD as well as the light flux reflected from the information recording surface RL3 of the CD, and an objective optical system OBJ further consisting of an aberration-correcting element L1 (first optical element) and a light condensing element L2 (second optical element) having an aspherical surface on both sides provided with a function of condensing the laser light flux having passed through the aberration-correcting element L1, on the information recording surfaces RL1, RL2 and RL3.

The optical pickup apparatus PU still further comprises a biaxial actuator AC1 for driving the objective optical system OBJ in the case of tracking and focusing, an aperture STO corresponding to the numerical aperture NA1 of the high-density optical disk HD, first through fourth polarizing beam splitters BS1, BS2, BS3 and BS4, first through third collimating lens COL1, COL2 and COL3, a beam expander EXP consisting of an negative lens E1 and a positive lens E2, a first sensor lens SEN1, a second sensor lens SEN2, and others.

In the optical pickup apparatus PU, when information is recorded and/or reproduced using the high-density optical disk HD, the blue-violet semiconductor laser LD1 is made to emit light, as the optical path is shown by a solid line in FIG. 1. After having been converted into the parallel light flux by the first collimating lens COL1, the diverged light flux emitted from the blue-violet semiconductor laser LD1 passes through the first polarizing beam splitter BS1, beam expander EXP and second polarizing beam splitter BS2. Then after the diameter has been regulated by the aperture STO, the light flux is changed a spot formed on the information recording surface RL1, through the first protective layer PL1 by the objective optical system OBJ. The effect of the objective optical system OBJ upon the wavelength λ1 will be described later. The objective optical system OBJ uses the biaxial actuator AC1 arranged on the periphery to perform focusing and tracking.

After passing through the objective optical system OBJ, polarizing beam splitter BS2 and beam expander EXP again, the reflected light flux modulated by the information pit on the information recording surface RL1 is reflected by the first polarizing beam splitter BS1, and is assigned with astigmatism by the sensor lens SEN1. Then it is converted into the converged light flux by the third collimating lens COL3, and converges on the light receiving surface of the first light detector PD1. The output signal of the light detector PD1 can be used to read the information recorded on the high-density optical disk HD.

When information is recorded and/or reproduced using the DVD, red semiconductor laser LD2 is made to emit light. The diverged light flux emitted from the red semiconductor laser LD2 passes through the third polarizing beam splitter and fourth polarizing beam splitter, as the light path is shown by a dotted line in FIG. 1, and is converted into the parallel light flux by the second collimating lens COL2. After that, it is reflected by the second polarizing beam splitter BS2, and is changed into a spot formed on the information recording surface RL2, through the second protective layer PL2 by the objective optical system OBJ. The effect of the objective optical system OBJ upon the light flux of the wavelength λ2 will be described later. The objective optical system OBJ uses the biaxial actuator AC1 arranged on the periphery to perform focusing and tracking. The reflected light flux modulated by the information pit on the information recording surface RL2 again passes through the objective optical system OBJ and is reflected by the second polarizing beam splitter BS2. It is then converted into the converged light flux by the second collimating lens COL2 and is reflected by the fourth polarizing beam splitter BS4. It is assigned with astigmatism by the second sensor lens SEN2 and converges on the light receiving surface of the second light detector PD2. The output signal of the light detector PD2 can be used to read the information recorded on the DVD.

When information is recorded and/or reproduced using the CD, infrared semiconductor laser LD3 is made to emit light. The diverged light flux emitted from the infrared semiconductor laser LD3 is reflected by the third polarizing beam splitter BS2 and passes through the fourth polarizing beam splitter BS4 as the light path is shown by a dotted line in FIG. 1. After having been converted into the parallel light flux by the second collimating lens COL2, the light flux is reflected by the second polarizing beam splitter BS2, and is changed into a spot formed on the information recording surface RL3, through the third protective layer PL3 by the objective optical system OBJ. The effect of the objective optical system OBJ upon the light flux of the wavelength λ3 will be described later. The objective optical system OBJ uses the biaxial actuator AC1 arranged on the periphery to perform focusing and tracking. The reflected light flux modulated by the information pit on the information recording surface RL3 again passes through the objective optical system OBJ and is reflected by the second polarizing beam splitter BS2. It is then converted into the converged light flux by the second collimating lens COL2 and is reflected by the fourth polarizing beam splitter BS4. It is assigned with astigmatism by the second sensor lens SEN2 and converges on the light receiving surface of the second light detector PD2. The output signal of the light detector PD2 can be used to read the information recorded on the CD.

The following describes the configuration of the objective optical system OBJ: The aberration-correcting element L1 includes a plastic lens having a refraction index nd of 1.5091 and Abbe's number vd of 56.5. The refractive index is 1.5242 for the wavelength λ1, 1.5064 for the wavelength λ2 and 1.5050 for the wavelength λ3. Further, the light condensing element L2 is a plastic lens having a refraction index nd of 1.5435 and Abbe's number vd of 56.3. Although not illustrated, a flange formed integrally with the optically functioning section is provided on each of the peripheries of the optically functioning section of the aberration-correcting element L1 (area where the first light flux passes) and that of the light condensing element L2 (area where the first light flux passes). The aberration-correcting element L1 is made integral with the light condensing element L2 by bonding parts of such flanges with each other, so that they can be handled as one objective optical system.

When the aberration-correcting element L1 is made integral with the light condensing element L2, it is also possible to arrange such a configuration that they are made integral through the mirror frame of a separate member.

Figure 2:
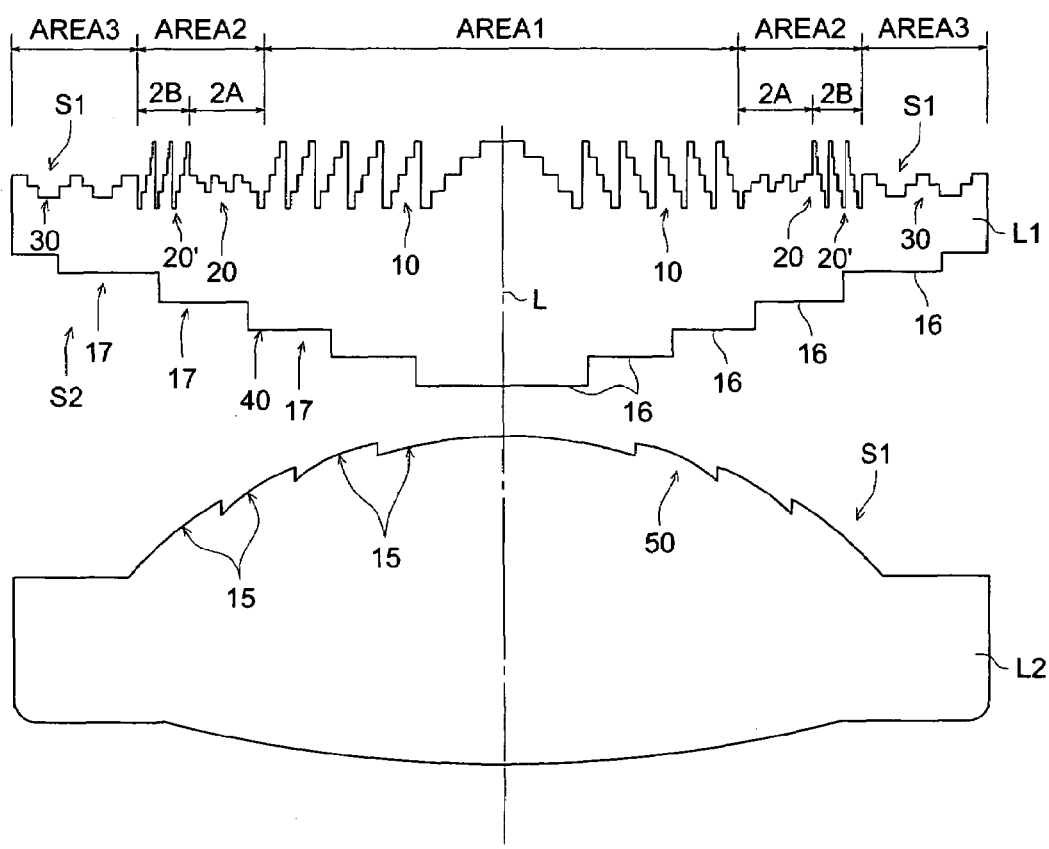
FIG. 2 is a side view representing an example of an objective optical system.

As shown in FIG. 2, the optical axis L is included in the optical surface S1 (light incidence surface) of the aberration-correcting element L1 on the side of the semiconductor laser beam source side, and is divided into:

a first area AREA 1, circular about the optical axis L, including the optical axis when the aberration-correcting element L1 is viewed in the direction of the optical axis L, the first area AREA 1 corresponding to the area with a numerical aperture not exceeding NA3;

a second area AREA 2, concentric about the optical axis, including the optical axis L when viewed in the direction of the optical axis L in the same manner, the second area AREA 2 having a numerical aperture not exceeding NA2 and located outside the first area AREA 1; and a third area AREA 3, concentric about the optical axis L, including the optical axis, when viewed in the direction of the optical axis L in the same manner, the second area AREA 2 having a numerical aperture not exceeding NA1 and located outside the second area AREA 2. The second area AREA 2 is further divided into a second-A area 2A closer to the optical axis L and a second-B area 2B farther from the optical axis L.

A first optical path difference-generating structure 10 is formed in the first area and a second diffraction structure 20 is formed in the second-A area. A diffraction structure 20' and a diffraction structure 30 are formed in each of the second-B area and the third area.

Figure 3:
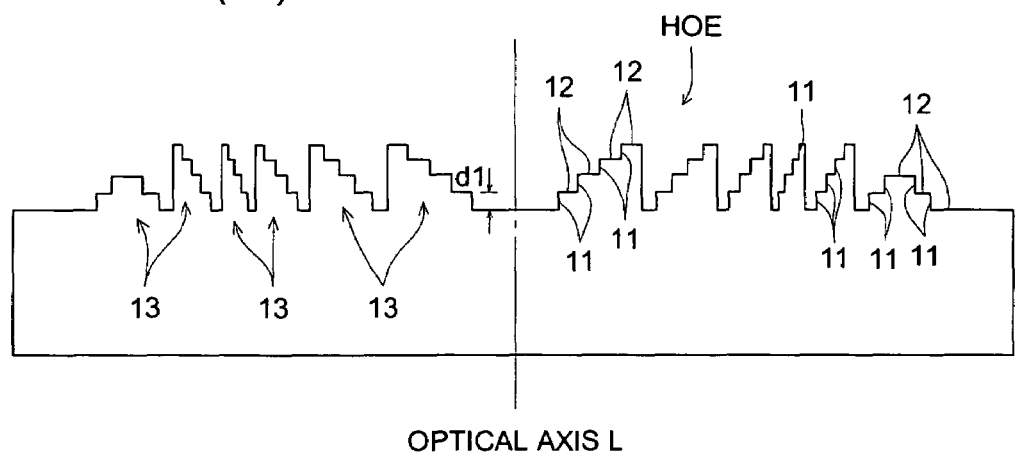
FIGS. 3, 4 and 5 are the side views representing an example of the configuration formed on the objective optical system.
Figure 3:
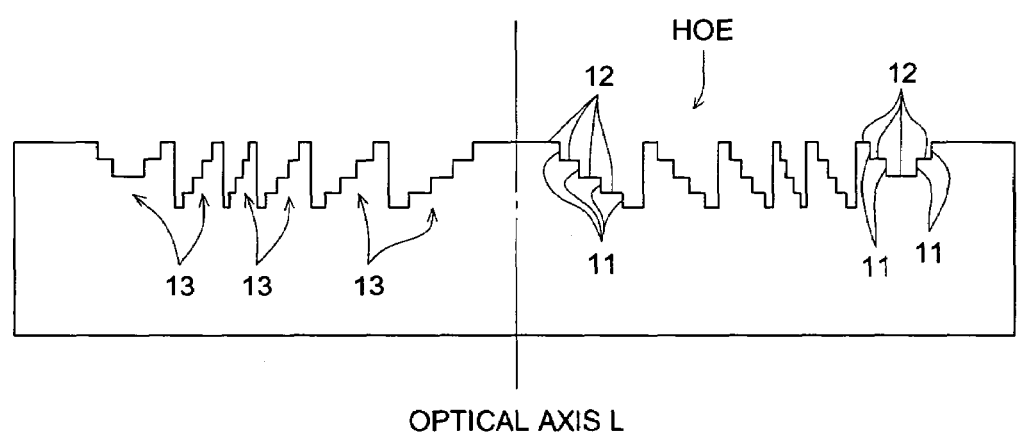

As shown in FIG. 3 schematically, the first optical path difference-generating structure 10, the second diffraction structure 20, the diffraction structure 20' in the second-B area and diffraction structure 30 in the third area each are composed of a plurality of the ring-shaped zones 13, having a stepped structure and consisting of a predetermined number of steps 11 and a discontinuous section 12, arranged concentrically about the optical axis L.

The second diffraction structure 20 has a different number of the discontinuous sections 12 from that of the first optical path difference-generating structure 10. The first optical path difference-generating structure 10 and diffraction structure 20' of the second-B area have the same number of discontinuous sections.

Figure 4:
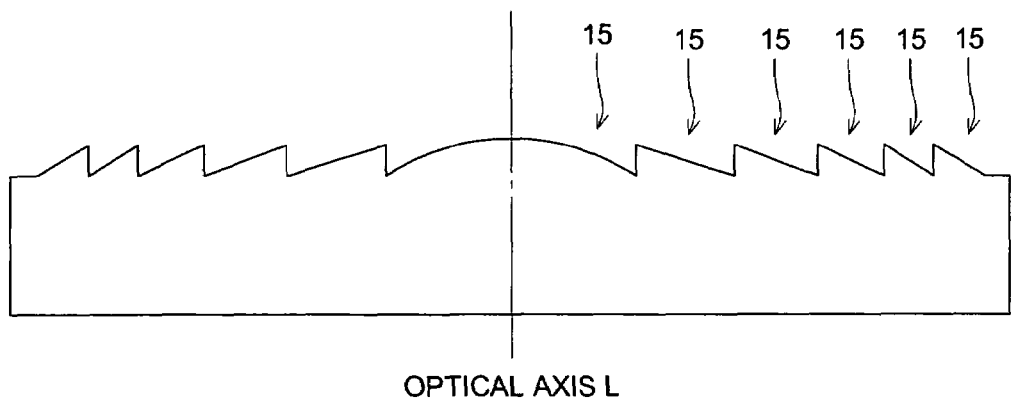
Figure 4:
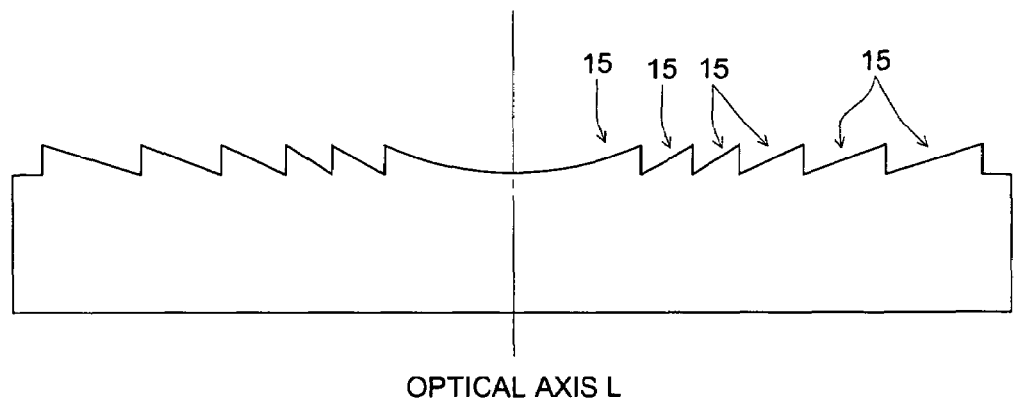
Figure 5A:
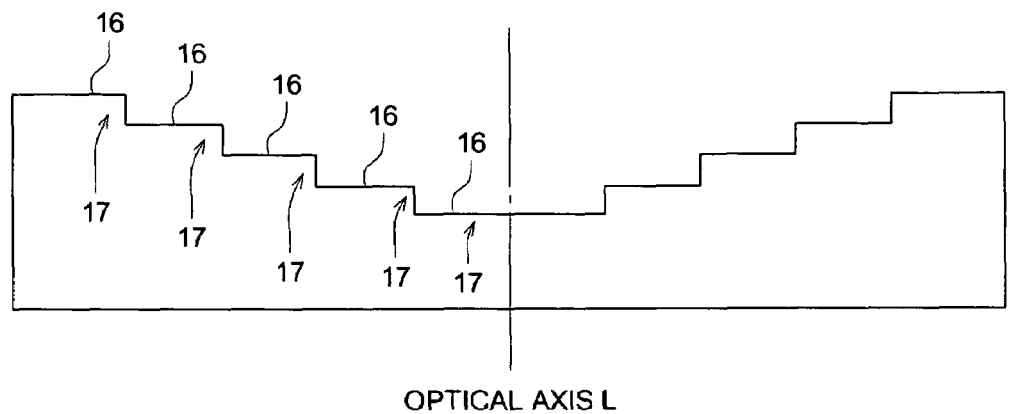
Figure 5B:
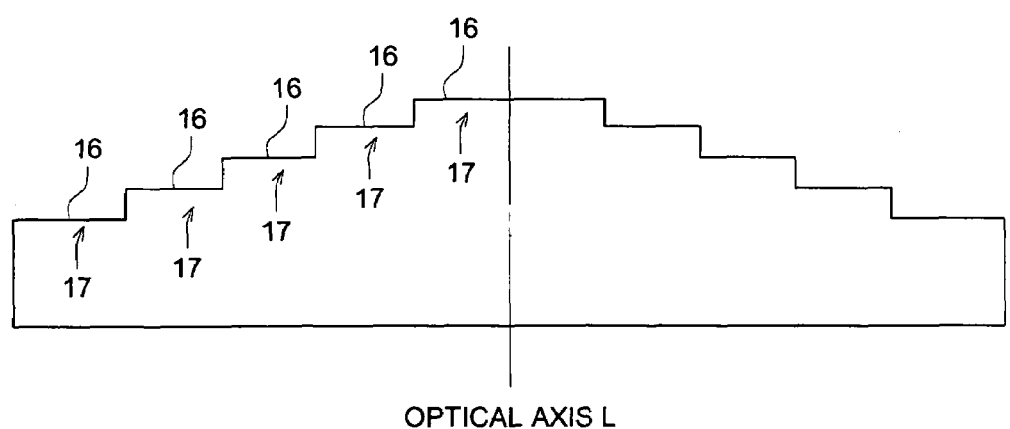

In addition to the one shown in FIG. 3, it is also possible to arrange such a configuration that the first optical path difference-generating structure 10 is made of a plurality of ring-shaped zones 15, as shown in FIG. 4 schematically for example, and the cross sectional view including the optical axis L is serrated. Alternatively, as shown in FIG. 5 schematically, the first optical path difference-generating structure 10 can be made of a plurality of ring-shaped zones 17 wherein the direction of the level difference of the step 16 is the same in the effective diameter, and the cross sectional view including the optical axis L is designed in a stepped form. For example, in the configuration shown in FIG. 5(a) schematically, the stepped structure is designed always in an ascending slope within the effective diameter around the optical axis L, whereby the level difference of the step 16 is oriented in the same direction within the effective diameter. Alternatively, in the configuration shown in FIG. 5(b) schematically, the stepped structure is designed always in a descending slope within the effective diameter around the optical axis L, whereby the level difference of the step 16 is oriented in the same direction within the effective diameter. FIGS. 3 through 5 schematically show the case where each structure is formed on a flat surface. It is also possible to make such arrangements that each structure is formed on a spherical surface or aspherical surface.

Except for the one shown in FIG. 3, the diffraction structure 20', diffraction structure 20' of the second-B area and diffraction structure 30 of the third area can be serrated in cross section, as shown in FIG. 4.

The first optical path difference-generating structure 10 is set so as to substantially assign the phase difference only to the light flux of wavelength λ2, out of the light fluxes of wavelength λ1, wavelength λ2 and wavelength λ3 passing through the discontinuous section 12, without assigning it to the light fluxes of wavelength λ1 and wavelength λ3. By being assigned with phase difference substantially, the light flux of wavelength λ2 is subjected to diffraction. The diffracted light of wavelength λ2 resulting therefrom, having the highest diffraction efficiency, can be used for the DVD.

To put it more specifically, assume that "n1" represents the refractive index of the aberration-correcting element L1 where the first optical path difference-generating structure 10 is formed, with respect to the light flux of the wavelength λ1; "d1" (FIG. 3) shows the level difference of the step 11 of the stepped structure in the first optical path difference-generating structure 10, in the direction of optical axis L; "m1" (integer) indicates the number of the discontinuous sections 12; and d=λ1/(n1−1). Arrangement is designed to ensure that $1.8 \times d \leq d1 \leq 2.2 \times d$ and $4 \leq m1 \leq 6$ are satisfied based on the above-mentioned assumption.

Thus, the level difference of the stepped structure in the first optical path difference-generating structure 10 is set to the depth approximately equivalent to an integral multiple of the wavelength λ1. When the light flux of wavelength λ1 is applied to the stepped structure where the amount of level difference (depth of the level difference) is so set, the difference in optical path equivalent to approximately an integral multiple of the wavelength λ1 is produced between the adjacent steps. This means that phase difference is not substantially assigned to the light flux of the wavelength λ1. The incidence light flux of the wavelength λ1 passes by directly without being diffracted in the first optical path difference-generating structure 10.

Further, when the light flux of wavelength λ3 has been applied to this stepped structure, the difference in optical path equivalent to an integral multiple of the wavelength λ3 is produced between the adjacent steps, since the wavelength λ3 is approximately twice the wavelength λ1. Similarly to the light flux of the wavelength λ1, the light flux of the wavelength λ3 passes by directly without being diffracted in the first optical path difference-generating structure 10, because phase difference is not substantially assigned thereto.

Meanwhile, phase difference conforming to the amount of level difference (depth of the level difference) occurs to the incidence light flux of wavelength λ2. This diffraction, for example, the diffracted light having an order of diffraction characterized by high diffraction efficiency can be utilized to record and/or reproduce information using the DVD, and to correct the chromatic aberration of the DVD or the spherical aberration resulting from temperature changes.

Further, only the light flux of wavelength λ3 having passed through the first area AREA 1 are used to record and/or reproduce the information using the CD, thereby eliminating the need of the light flux of wavelength λ3 having passed through the second area AREA 2. To ensure that the light flux of wavelength λ3 having passed through the second area AREA 2 is not condensed on the information recording surface RL3 of the CD, the light flux of wavelength λ3 having passed through the second area AREA 2 is provided diffraction by the second diffraction structure 20 formed on the second-A area and the diffraction structure 20' formed on the second-B area, and the diffracted lights, generated thereby, having the order of diffraction characterized by a higher diffraction efficiency (e.g. 30% or higher) are "flared" (scattered or dispersed in order to prevent the required condensed spot of light from being adversely affected). In this case, the order of diffraction of the diffracted light having a higher diffraction efficiency for the light flux of wavelength λ3 becomes different from the that of the diffracted light having a higher diffraction efficiency to the light flux of wavelength λ2.

The objective optical system OBJ is provided with an aperture restricting function corresponding to the numerical aperture NA3 by the above-mentioned "flaring", and longitudinal spherical aberration of the light flux having wavelength λ3 can be made discontinuous over the range from the first area AREA 1 to the second area AREA 2 by the second diffraction structure 20, thereby improving the accuracy of detecting the reflected light from the CD, of the light flux of wavelength λ3 in the second light detector PD2.

A plurality of diffracted lights with respect to the light flux of wavelength λ3 (e.g. diffracted lights of positive first order and negative first order) have approximately the same diffraction efficiency (e.g. about 40%) in some cases. In such a case, one has only to "flare" all the multiple diffracted lights having the order of diffraction characterized by a higher diffraction efficiency or the diffracted lights having the order of diffraction that may be condensed on the information recording surface RL3 of the CD.

The light flux of wavelength λ1 passing through the second area AREA 2 does so without being assigned substantially with phase difference, while the light flux of wavelength λ2 passing through the second area AREA 2 is assigned substantially with phase difference. Accordingly, information can be recorded and/or reproduced using the DVD, using the diffraction, e.g. using the diffracted lights having the order of diffraction characterized by a higher diffraction efficiency, and at the same time, the chromatic aberration of the DVD and spherical aberration resulting from temperature changes can be corrected.

The light flux of wavelength λ2 and light flux of wavelength λ3 having passed through the third area AREA 3 are not necessary for recording/reproducing of the information from the DVD and CD. To ensure that the light flux of wavelength λ2 having passed through the third area AREA 3 will not condense on the information recording surface RL2 of the DVD and the light flux of the wavelength λ3 passed through the third area AREA 3 will not condense on the information recording surface RL3 of the CD, diffraction is applied by the diffraction structure 30 formed in the third area AREA 3, and the diffracted lights, generated thereby, having the order of diffraction characterized by a higher diffraction efficiency (e.g. 30% or higher) is "flared". In some cases, a plurality of diffracted lights (e.g. diffracted lights of positive first order and negative first order) have approximately the same diffraction efficiency (e.g. about 40%). In such cases, it is preferable to "flare" all the multiple diffracted lights having the order of diffraction characterized by a higher diffraction efficiency or the diffracted lights having the order of diffraction that may be condensed on the information recording surface RL2 of the DVD and/or the information recording surface RL3 of the CD. This procedure allows the objective optical system OBJ to have the aperture restricting function regarding the NA2.

The second optical path difference-generating structure 40 is formed on the optical surface S2 (light output surface) of the aberration-correcting element L1 on the optical disk side.

The second optical path difference-generating structure 40 consists of a plurality of ring-shaped zones 17 where the direction of the level difference of the step 16 is the same within the effective diameter, as shown in FIG. 5. The cross section including the optical axis L is designed in a stepped structure, without substantially assigning phase difference to the incidence light fluxes of wavelength λ1 and wavelength λ2.

To put it more specifically, the second optical path difference-generating structure 40 is set in such a way that the optical path difference P times that of the wavelength λ1 will be assigned when the incidence light flux of the wavelength λ1 passes through the ring-shaped zones 17, and the optical path difference Q times that of the wavelength λ2 will be assigned when the incidence light flux of the wavelength λ2 passes through the ring-shaped zones 17. When the function of optical path difference $\phi(h)$ is used, this is defined as $\phi(h)=(B_2 \times h^2 + B_4 \times h^4 + \ldots + B_{2i} \times h^{2i}) \times \lambda \times P$. Arrangements are made in such a way that, when the coefficient $B_2=0$ is substituted in this equation, $\phi(\max)>0$ will be obtained.

In this equation, "h" is the height from the optical axis, "$B_{2i}$" is the coefficient of an optical path difference, "i" is a natural number, "λ" is the blazed wavelength, "hmax" is the height from an optical axis L as the numerical aperture NA1 of a high-density optical disk HD.

Combinations between P and Q include (P, Q)=(5, 3), (8, 5) and (10, 6).

When the light fluxes of the wavelength λ1 and wavelength λ2 have entered perpendicularly the optical surface (light output surface S2 in the embodiment of the present invention) with the second optical path difference-generating structure 40 formed thereon, then the difference between the output angle of the light flux of the wavelength λ1 and the output angle of the light flux of wavelength λ2 resulting from the second optical path difference-generating structure can be expressed by the difference between the following equation (1) and the following equation (2):

$$n1 \times \sin(\theta 1) = P \times \lambda 1 / p \quad (1)$$

$$n2 \times \sin(\theta 2) = P \times \lambda 1 / p \quad (2)$$

where n1: refractive index of aberration-correcting element L1 in the wavelength λ1 n2: refractive index of aberration-correcting element L1 in the wavelength λ2

θ1: output angle of the wavelength λ1 resulting from the second optical path difference-generating structure θ2: output angle of the wavelength λ2 resulting from the second optical path difference-generating structure p: pitch of the ring-shaped zones in the second optical path difference-generating structure It is commonly known that, as the influence of the optical element upon the refractive index, a change in wavelength is more influential than a change in the refractive index of the optical element per se. In the embodiment of the present invention, refraction (output angle) depends on the changes of the wavelength λ1 and wavelength λ2.

For example, when the wavelength λ1=405 nm and wavelength λ2=655 nm, the difference between λ1 and (Q/P)×λ2 is 250 nm if (P, Q)=(1, 1). Thus, the output angle of each light flux due to the diffraction exhibits in an increase. Whereas a decrease is shown as in −12 nm when (P, Q) is (5, 3), 4 nm when (P, Q) is (8, 5), and −12 nm when (P, Q) is (10, 6). Thus, if a combination of any one of (P, Q)=(5, 3), (8, 5) and (10, 6) is used, the output angles of light fluxes due to diffraction become approximately equal to one another. This allows mutual diffraction to be handled as substantially non-existent. Thus, as described above, the second optical path difference-generating structure is arranged so that $\phi(\text{hmax})>0$ will be satisfied. This arrangement allows the aberration resulting from the first diffraction structure 50 and first optical path difference-generating structure 10 to be reduced by the second optical path difference-generating structure 40, when a fluctuation of several nanometers in the wavelength has occurred to the light fluxes of the wavelength λ1 and wavelength λ2.

The first diffraction structure 50 is arranged on the optical surface S1 (light incidence surface) of the light condensing element L2 on the semiconductor laser source side, as shown in FIG. 2.

The first diffraction structure 50 has a plurality of ring-shaped zones 15 as shown in FIG. 4, and the cross section including the optical axis L is serrated.

In addition to the one shown in FIG. 4, the first diffraction structure 50 can be the one shown in FIG. 3.

The light fluxes of wavelengths λ1, λ2 and λ3 having passed the aberration-correcting element L1 are diffracted by the first diffraction structure 50. After having been refracted on the light output surface S2 of the light condensing element L2, the L-th order diffracted light (where L denotes an odd number) of the light flux of wavelength λ1 resulting therefrom is designed to form a light condensed spot on the information recording surface RL1 of the high-density optical disk HD. Further, after having been refracted on the light output surface of the light condensing element L2, the M-th order diffracted light (where M indicates an integer) of the light flux of the wavelength λ2 is designed to form a light condensed spot on the information recording surface RL2 of the DVD. Further, after having been refracted on the light output surface of the light condensing element L2, the N-th order diffracted light (N indicates an integer) of the wavelength λ3 is designed to form a light condensed spot on the information recording surface RL3 of the DVD.

To put it another way, arrangements are made in such a way that the first diffraction structure 50 corrects aberration so that the L-th order diffracted light of wavelength λ1 will form a satisfactory light condensed spot on the information recording surface RL1 of the high-density optical disk HD; so that the M-th order diffracted light of wavelength λ2 will form a satisfactory light condensed spot o the information recording surface RL2 of the DVD using a phase difference provided when passing the first optical path difference-generating structure 10; and so that the N-th order diffracted light of wavelength λ3 will form a satisfactory light condensed spot on the information recording surface RL3 of the CD.

Generally, there is a decrease in the intensity of diffracted light with increasing distance from the optical axis L. This decrease is greater for the diffracted light having a higher order of diffraction, with the result that inconvenience may be caused in practical use. To prevent this, it is preferred to use the diffracted light having the lowest possible order of diffraction. Combinations of the L, M and N of this nature include (L, M, N)=(1, 1, 1) and (3, 2, 2).

When the diffraction efficiencies of the diffracted lights of L-th, M-th and N-th orders are assumed as η1, η2 and η3, respectively, it is particularly preferred that the diffraction efficiency satisfies η1>85%, η2>80% and η3>75%, in order to achieve compatibility among the high-density optical disk HD, DVD and CD.

In the present embodiment, the objective optical system OBJ is designed to consists of two groups; the aberration-correcting element L1 and light condensing element L2. This allows the diffraction power and refraction power to be shared by two optical elements, and improves the freedom in designing. However, without being restricted thereto, the objective optical system OBJ may be composed of a single lens; or the light incidence and output surfaces of this lens may be provided with the above-mentioned optical path difference-generating structure or diffraction structure.

Alternatively, the aberration-correcting element L1 may be provided with the first diffraction structure 50 and first optical path difference-generating structure 10. In this case, the light condensing element L2 can be made of glass lens, with the result that generation of aberration due to temperature changes can be minimized.

Further, as in the embodiment of the present invention, it is preferred that the light incidence surface S1 of the aberration-correcting element L1 be provided with the first optical path difference-generating structure 10. Especially when the first optical path difference-generating structure 10 is designed in a stepped structure consisting of a predetermined number of steps 11 and discontinuous sections 12 as shown in FIG. 3, the level difference in the direction of optical axis L will increase, as compared with the serrated structure shown in FIG. 4. This will cause eclipse and reduce the diffraction efficiency. To prevent this, the light incidence surface (light incidence surface S1 of the aberration-correcting element L1) is preferably provided with the first optical path difference-generating structure 10, where each light flux is composed of a parallel light flux.

Further, assuming that the focal distance of the aberration-correcting element L1 is fa and that of the light condensing element L2 is fb, the lens is preferably designed in such a way that the condition $|1/fa|<0.02$ mm$^{-1}$ will be satisfied, or the curvature radius in the paraxial of at least one surface of the aberration-correcting element L1 will be approximately infinite. Thus, an error in the assembling of the aberration-correcting element L1 and light condensing element L2 can be minimized by reducing the refraction force of the aberration-correcting element L1. in this manner. Further, when the optical surface is formed in an approximately flat surface, the first optical path difference-generating structure 10 and first diffraction structure 50 can be easily formed on the optical surface.

The focal position of the diffracted light of N-th order when recording and/or reproducing the information using a CD and the focal position of the diffracted light of N±1-th order are preferably kept apart from each other by 0.01 mm or more in the direction of optical axis L. This can be achieved by coefficient $A_2 \neq 0$ when $\phi_1(h)=(A_2 \times h^2+A_4 \times h^4+\ldots+A_{2i} \times h^{2i}) \times \lambda \times N$ is defined using the optical path difference function $\phi_1$ of the first diffraction structure 50, wherein "h" is the height from the optical axis, "$A_{2i}$" is the coefficient of the optical path difference, "i" is a natural number and "λ" is the blazed wavelength.

In the present embodiment, the light incidence surface S1 of the aberration-correcting element L1 has been assumed to be divided into the first area AREA 1, second area AREA 2 and third area AREA 3. However, it is also possible to make such arrangements that the light incidence surface S1 is divided into the first area AREA 1 and second area AREA 2, without the third area AREA 3 being provided, and diffraction is applied to the light flux of wavelength λ3 having passed through the second area AREA 2, whereby the light flux of wavelength λ3 is "flared".

It is also possible to arrange such a configuration that the optical element constituting the objective optical system OBJ is equipped with the dichroic filter and liquid crystal phase control element, whereby the objective optical system is equipped with the aperture restricting function.

An optical information recording apparatus capable of recording the optical information on the optical disk and/or reproducing the information recorded on the optical disk can be provided by mounting the optical pickup apparatus PU described in the above-mentioned embodiment, a drive apparatus for rotatably holding the optical disk and a control apparatus for controlling the drive of these devices (not illustrated)

Embodiment 2

The high-density optical disk HD has the following optical specifications: first wavelength λ1: 407 nm, with the first protective layer PL1 having a thickness of t1=0.6 nm and numerical aperture NA1 of 0.65. The DVD has the following optical specification: second wavelength λ2: 658 nm, with the second protective layer PL2 having a thickness of t2=0.6 mm and numerical aperture NA2 of 0.65. The CD has the following optical specification: third wavelength λ3: 785 nm, with the third protective layer PL3 having a thickness of t3=1.2 mm and numerical aperture NA3 of 0.50.

The optical pickup apparatus PU in the second embodiment is has approximately the same configuration as that of the first embodiment shown in FIG. 1. Its detailed description will be omitted to avoid duplication.

Working Examples of Embodiment

Figure 6:
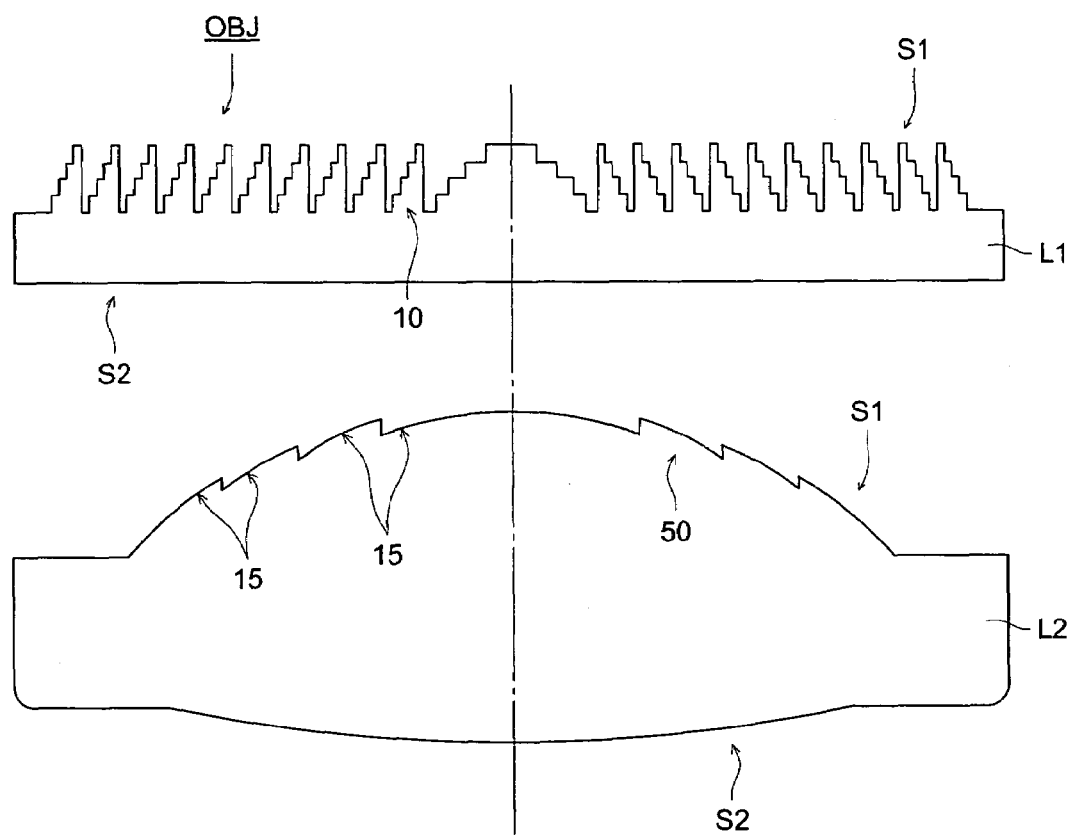
FIG. 6 is a side view showing an objective optical system in an embodiment.

The following describes the working example of the present embodiment:

As shown in FIG. 6, in the present embodiment, the objective optical system OBJ consists of two optical elements; an aberration-correcting element L1 and light condensing element L2. The light incidence surface S1 (second surface) of the aberration-correcting element L1 and light output surface S2 (third surface) are designed in an aspherical form.

The light incidence surface S1 of the aberration-correcting element L1 is provided with the first optical path difference-generating structure 10 comprising a plurality of ring-shaped zones arranged concentrically about the optical axis, wherein each of these ring-shaped zones consists of a predetermined number of steps and discontinuous sections and has a stepped structure. The light incidence surface S1 of the light condensing element L2 is provided with the first diffraction structure 50 consisting of a plurality of ring-shaped zones 15 wherein the cross section including the optical axis L is serrated.

Table 1 shows the lens data of the first example.

TABLE 1

Example of embodiment ①

| | Focal distance | $f_1$ = 3.10 mm | $f_2$ = 3.19 mm | $f_3$ = 3.23 mm |
|---|---|---|---|---|
| | Numerical aperture | NA1 = 0.65 | NA2 = 0.65 | NA3 = 0.50 |
| | Magnification of image formation | m = 0.0 | m = 0.0 | m = 0.0 |

| i-th plane | Ri | di (407 nm) | ni (407 nm) | di (658 nm) | ni (658 nm) | di (785 nm) | ni (785 nm) | Remarks |
|---|---|---|---|---|---|---|---|---|
| 0 | ∞ | ∞ | | ∞ | | ∞ | | |
| 1 | ∞ | 0.00 | 1.0 | 0.00 | 1.0 | 0.00 | 1.0 | Aperture |
| 2 | ∞ | 0.80 | 1.55981 | 0.80 | 1.54062 | 0.80 | 1.53724 | Diffracted plane |
| 3 | ∞ | 0.10 | 1.0 | 0.10 | 1.0 | 0.10 | 1.0 | |
| 4 | 1.93657 | 1.73 | 1.55981 | 1.73 | 1.54062 | 1.73 | 1.53724 | Aspherical and diffracted planes |
| 5 | −11.34980 | 1.735 | 1.0 | 1.79694 | 1.0 | 1.45384 | 1.0 | Aspherical plane |
| 6 | ∞ | 0.6 | 1.61869 | 0.6 | 1.577315 | 1.2 | 1.57063 | |
| 7 | ∞ | | | | | | | |

"di" denotes the displacement from the i-th plane to (i + 1)th plane.

Data on aspherical and diffracted planes

| Second plane Coefficient of optical path difference function | | Stepped structure |
|---|---|---|
| B2 | −1.6302E+00 | m1 = 5 |
| B4 | −1.3206E−01 | d1 = 2 × d |
| B6 | 6.7775E−02 | Only the λ2 is assigned with phase difference, and diffraction occurs. |
| B8 | −8.4521E−03 | Almost no phase difference occurs to the λ1 and λ3, so diffraction does not take place. |

| 4th plane Aspherical surface coefficient | | Coefficient of optical path difference function | | Serrated structure |
|---|---|---|---|---|
| κ | −1.2732E+00 | B4 | −3.1830E+00 | When blazed wavelength is subjected to third-order diffraction at 445 nm, we get the order of diffraction: |
| A4 | 1.0740E−02 | B6 | 2.3751E−01 | L = 3, |
| A6 | 3.2020E−04 | B8 | −1.9474E−01 | M = N = 2 |
| A8 | 2.6844E−04 | B10 | 2.2032E−02 | where η1 = 72%, η2 = 99% and η3 = 65%. |
| A10 | −1.4918E−04 | | | |
| A12 | 4.0856E−05 | | | |
| A14 | −5.3878E−06 | | | |

| 5th plane Aspherical surface coefficient | |
|---|---|
| κ | −1.8439E+00 |
| A4 | 9.4757E−03 |
| A6 | 9.3834E−04 |
| A8 | −9.8769E−04 |
| A10 | 1.6945E−04 |
| A12 | −1.1458E−05 |

"Ri" in Table 1 indicates the curvature radius, "di" shows the position in the direction of optical axis from the i-the surface to the (i+1)th surface, and "ni" denotes the refractive index of each surface.

As shown in Table 1, the optical pickup apparatus of the present example is set as follows: the focal distance $f_1$=3.10 mm when the wavelength λ1 emitted from the first light source is 407 nm, numerical aperture NA1=0.65 on the image side and magnification of image formation m=0; the focal distance $f_2$=3.19 mm when the wavelength λ2 emitted from the second light source is 658 nm, numerical aperture NA2=0.65 on the image side and magnification of image formation m=0; and the focal distance $f_3$=3.23 mm when the wavelength λ3 emitted from the third light source is 785 nm, numerical aperture NA3=0.50 on the image side and magnification of image formation m=0. The height hmax from the optical axis L serving as the numerical aperture NA1 is 2.015 mm.

The number of the discontinuous section of the first optical path difference-generating structure is represented as m1=5, and level difference of the step in the direction of optical axis is shown as d1=2×d. There is a small change in phase with respect to the light fluxes of the wavelength λ1 and wavelength λ3 (substantially no phase difference assigned), where diffraction does not occur. The phase difference is substantially assigned only to the light flux of wavelength λ2, where diffraction occurs. Here, d=λ1/(n1−1) is satisfied.

The light incidence surface (fourth surface) and output surface (fifth surface) of the light condensing element are formed in the aspherical form, axially symmetric about the optical axis, defined by the equation obtained by substituting the coefficient of Table 1 in the following equation (3).

[Eq. 1]

$$X(h) = \frac{(h^2/R)}{1 + \sqrt{1 - (1+\kappa)(h/R)^2}} + \sum_{i=0}^{9} A_{2i} h^{2i} \qquad (3)$$

where "X(h)" denotes a change in the direction of optical axis from the plane in contact with the apex of the aspherical surface on the optical surface (where light traveling direction is positive), "κ" shows the coefficient of a cone, "$A_{2i}$," indicates the aspherical coefficient and "h" represents the height from the optical axis.

The length of an optical path assigned to the light flux of each wavelength by the first optical path difference-generating structure and first diffraction structure 50 is defined by the equation obtained by substituting the coefficient of Table 1 into the optical path difference function in the following equation (4).

[Eq. 2]

$$\Phi(h) = \sum_{i=0}^{5} B_{2i} h^{2i} \quad (4)$$

where "$B_{2i}$" denotes the coefficient of the optical path difference function.

As shown in Table. 1, in the first example, the diffraction efficiencies (η1, η2, η3) of the diffracted lights of L-th order, M-th order and N-th order emitted from the objective optical system were η1=72%, η2=99% and η3=65%.

Figure 7:
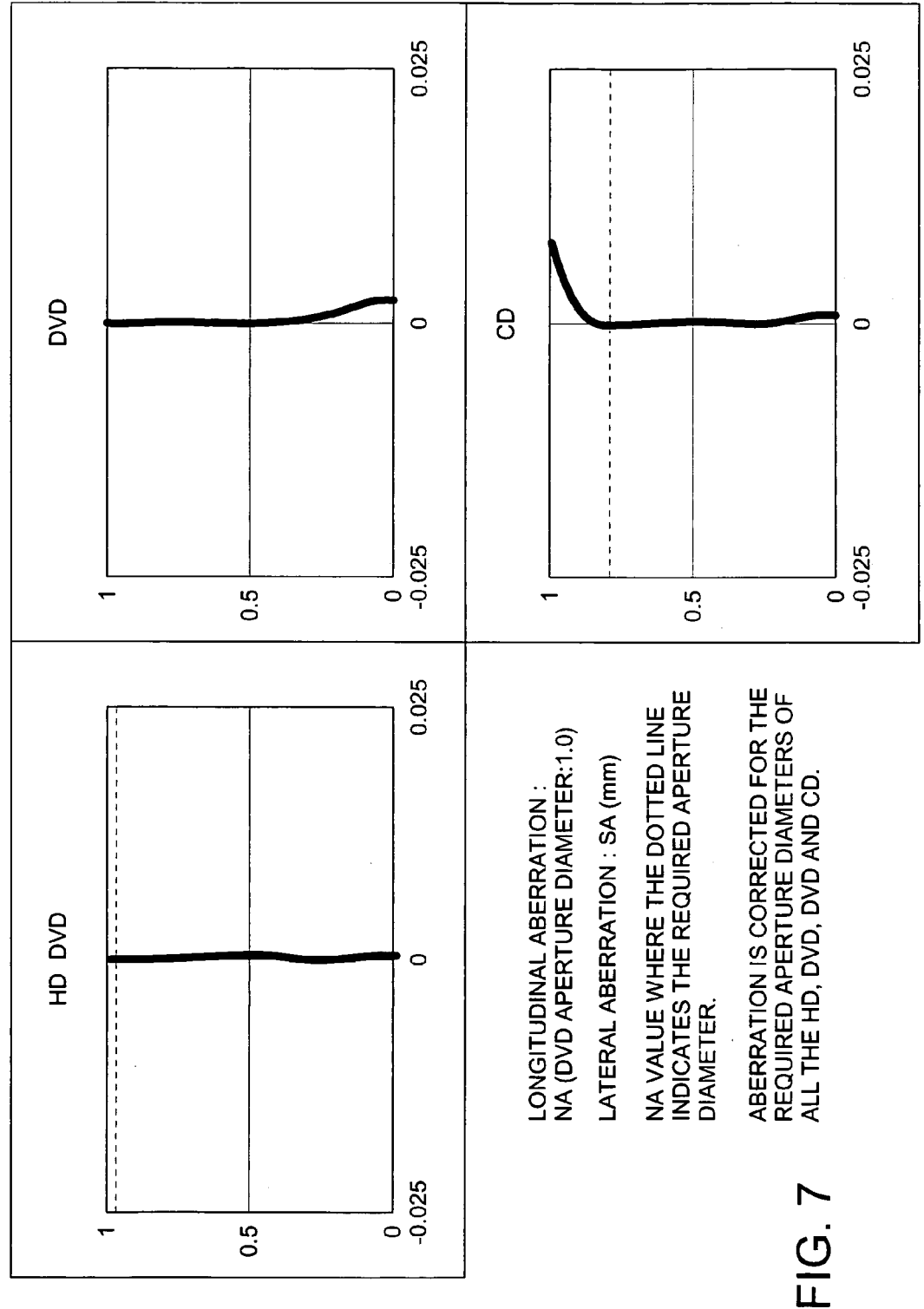
FIG. 7 is a longitudinal spherical aberration drawing.

FIG. 7 is a drawing representing the longitudinal spherical aberration of the light flux (for HD) of wavelength λ1, the light flux (for DVD) of wavelength λ2 and the light flux (for CD) of wavelength λ3.

FIG. 7 suggests that the longitudinal spherical aberration is reduced within the required numerical aperture in all light fluxes.

Table 2 shows the lens data in the second example.

TABLE 2

Example of embodiment ②

| | Focal distance | $f_1$ = 3.10 mm | $f_2$ = 3.15 mm | $f_3$ = 3.15 mm |
|---|---|---|---|---|
| | Numerical aperture | NA1 = 0.65 | NA2 = 0.65 | NA3 = 0.50 |
| | Magnification of image formation | m = 0.0 | m = 0.0 | m = 0.0 |

| i-th plane | Ri | di (407 nm) | ni (407 nm) | di (658 nm) | ni (658 nm) | di (785 nm) | ni (785 nm) | Remarks |
|---|---|---|---|---|---|---|---|---|
| 0 | | ∞ | | ∞ | | ∞ | | |
| 1 | ∞ | 0.00 | 1.0 | 0.00 | 1.0 | 0.00 | 1.0 | Aperture |
| 2 | ∞ | 0.80 | 1.55981 | 0.80 | 1.54062 | 0.80 | 1.53724 | Diffracted plane |
| 3 | ∞ | 0.10 | 1.0 | 0.10 | 1.0 | 0.10 | 1.0 | |
| 4 | 1.96453 | 1.73 | 1.55981 | 1.73 | 1.54062 | 1.73 | 1.53724 | Aspherical and diffracted planes |
| 5 | −11.33473 | 1.7072 | 1.0 | 1.7599 | 1.0 | 1.3746 | 1.0 | Aspherical plane |
| 6 | ∞ | 0.6 | 1.61869 | 0.6 | 1.577315 | 1.2 | 1.57063 | |
| 7 | ∞ | | | | | | | |

"di" denotes the displacement from the i-th plane to (i + 1)th plane.

Data on aspherical and diffracted planes

| Second plane Coefficient of optical path difference function | | Stepped structure |
|---|---|---|
| B4 | 2.0505E−01 | m1 = 5 |
| B6 | 4.6553E−02 | d1 = 2 × d |
| | | Only the λ2 is assigned with phase difference, and diffraction occurs. |
| | | Almost no phase difference occurs to the λ1 and λ3, so diffraction does not take place. |

| 4th plane Aspherical surface coefficient | | Coefficient of optical path difference function | | Serrated structure |
|---|---|---|---|---|
| κ | −4.3512E−01 | B2 | −7.3710E+00 | When blazed wavelength is subjected to first-order |
| A4 | −3.2650E−03 | B4 | −1.4622E+00 | diffraction at 500 nm, we get the order of diffraction: |
| A6 | −1.9462E−04 | B6 | 1.1897E−01 | L = M = N = 1 |
| A8 | 3.5166E−04 | B8 | −7.2828E−02 | where η1 = 77%, η2 = 83% and η3 = 63%. |
| A10 | −1.1465E−04 | B10 | 6.4014E−03 | |
| A12 | 5.8772E−06 | | | |
| A14 | −5.7227E−07 | | | |

| 5th plane Aspherical surface coefficient | |
|---|---|
| κ | −4.7855E+01 |
| A4 | −9.8664E−04 |
| A6 | 8.9099E−03 |
| A8 | −5.2001E−03 |
| A10 | 1.3690E−03 |
| A12 | −1.8183E−04 |
| A14 | 9.8685E−06 |

"Ri" in Table 1 indicates the curvature radius, "di" shows the position in the direction of optical axis from the i-the surface to the (i+1)th surface, and "ni" denotes the refractive index of each surface.

As shown in Table 1, the optical pickup apparatus of the present example is set as follows: the focal distance $f_1$=3.10 mm when the wavelength λ1 emitted from the first light source is 407 nm, numerical aperture NA1=0.65 on the image side and magnification of image formation m=0; the focal distance $f_2$=3.15 mm when the wavelength λ2 emitted from the second light source is 658 nm, numerical aperture NA2=0.65 on the image side and magnification of image formation m=0; and the focal distance $f_3$=3.15 mm when the wavelength λ3 emitted from the third light source is 785 nm, numerical aperture NA3=0.50 on the image side and magnification of image formation m=0. The height hmax from the optical axis L serving as the numerical aperture NA1 is 2.015 mm.

The number of the discontinuous section of the first optical path difference-generating structure is represented as m1=5, and level difference of the step in the direction of optical axis is shown as d1=2×d. There is a small change in phase with respect to the light fluxes of the wavelength λ1 and wavelength λ3, where diffraction does not occur. The phase difference is substantially assigned only to the light flux of wavelength λ2, where diffraction occurs. Here, d=λ1/(n1−1) is satisfied.

The light incidence surface (fourth surface) and output surface (fifth surface) of the light condensing element are formed in the aspherical form, axially symmetric about the optical axis, defined by the equation obtained by substituting the coefficient of Table 2 in the above-mentioned equation (3), as in the case of the first example.

The length of an optical path assigned to the light flux of each wavelength by the first optical path difference-generating structure and first diffraction structure is defined by the equation obtained by substituting the coefficient of Table 2 into the optical path difference function in the following equation (4), as in the case of the first example.

As shown in Table 2, in the second example, the diffraction efficiencies (η1, η2, η3) of the diffracted lights of L-th order, M-th order and N-th order emitted from the objective optical system were η1=77%, η2=83% and η3=63%. Further, the focal position of the diffracted light of N-th order and that of the diffracted light of N±1-th order are kept apart from each other by 0.1 mm or more in the direction of optical axis.

In the first and second examples, the objective optical system concerning the second embodiment related to the HD and DVD as a high-density optical disk was used as a specific example for explanation. It goes without saying that the present invention is applicable to the first embodiment related to the BD (Blu-ray disk) as a high-density optical disk, and the objective optical system can be designed or re-designed in that case whenever required.

EFFECTS OF THE INVENTION

The present invention is to provide an objective optical system, optical pickup apparatus and optical information recording/reproducing apparatus, capable of ensuring the compatibility among three types of optical disks—high-density optical disk using a blue-violet laser light source, DVD and CD—, securing the amount of light and correcting spherical aberration.

It is to be noted that various changes and modifications will be apparent to those skilled in the art. Therefore, unless such changes and modifications depart from the scope of the present invention, they should be construed as being included therein.

What is claimed is:

1. An objective optical system for use in an optical pickup apparatus for at least one of recording or reproducing information from or onto a first optical disk having a protective layer thickness t1 using a first light flux having a wavelength λ1 emitted from a first light source, for at least one of recording or reproducing information from or onto a second optical disk having a protective layer thickness t2 (t1≦t2) using a second light flux having a wavelength λ2 (λ1≦λ2) emitted from a second light source, and for at least one of recording or reproducing information from or onto a third optical disk having a protective layer thickness t3 (t2<t3) using a third light flux having a wavelength λ3 (λ2<λ3) emitted from a third light source, the objective optical system comprising:

a diffraction structure for providing diffraction to the first light flux, the second light flux and the third light flux, so that a diffraction efficiency of a L-th order (L: odd number) diffracted light of the first light flux is greater than that of any other order diffracted light of the first light flux, so that a diffraction efficiency of a M-th order (M: integer) diffracted light of the second light flux is greater than that of any other order diffracted light of the second light flux, and so that a diffraction efficiency of a N-th order (N: integer) diffracted light of the third light flux is greater than that of any other order diffracted light of the third light flux; and an optical path difference-generating structure for substantially providing a phase difference to one or two of the first light flux, the second light flux or the third light flux, while not substantially providing any phase difference to at least one of the first light flux, the second light flux or the third light flux, wherein the diffraction structure is designed in a serrated structure, and the optical path difference-generating structure is composed of a plurality of ring-shaped zones arranged concentrically about an optical axis, each of the ring-shaped zones having a stepped structure, and wherein the objective optical system is composed of a first optical element and/or a second optical element, and when "n1" denotes a refractive index of said first optical element on which the optical path difference-generating structure is formed, with respect to the first light flux, "d1" denotes a level difference of the stepped structure of the optical path difference-generating structure in the direction of the optical axis, "m1" (an integer) denotes the number of discontinuous sections of the stepped structure, and d=λ1/(n1−1), then the following conditions are satisfied:

1.8×$d$≦$d1$≦2.2×$d$, and 4≦m1≦6.

2. The objective optical system of claim 1, wherein a focal position of the N-th order diffracted light and that of a diffracted light of a (N±1)th order are kept apart from each other by 0.1 mm or more in a direction of the optical axis, for recording or reproducing information to the third optical disk.

* * * * *